Figure 6:
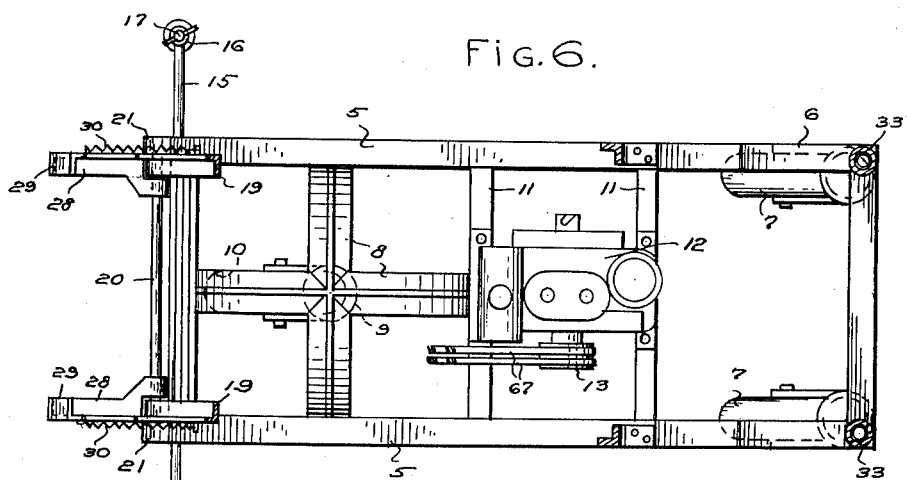

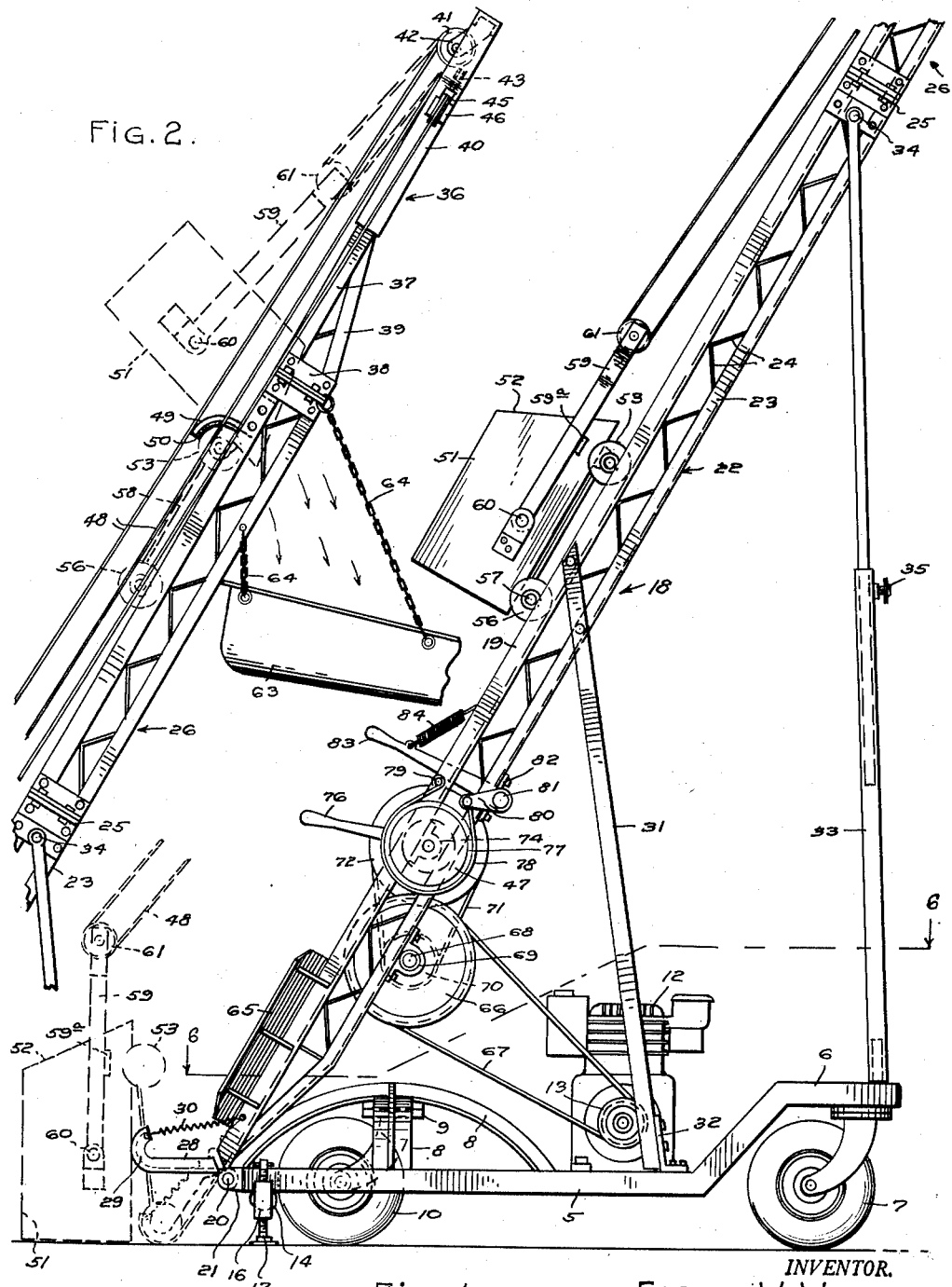
Feb. 20, 1951 — E. W. WHITE — 2,542,383
PORTABLE ELEVATING CONVEYER
Filed Dec. 20, 1949 — 3 Sheets-Sheet 1
INVENTOR.
EARNEL W. WHITE,
ATTORNEY.

Feb. 20, 1951     E. W. WHITE     2,542,383
PORTABLE ELEVATING CONVEYER
Filed Dec. 20, 1949     3 Sheets-Sheet 2
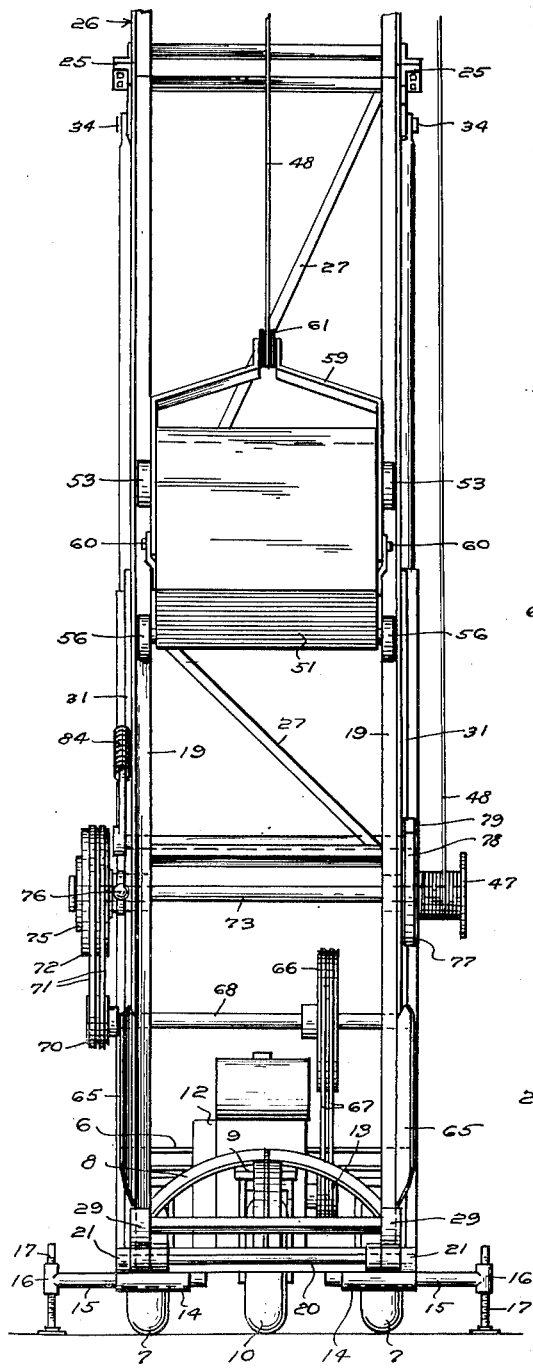
Fig. 3.
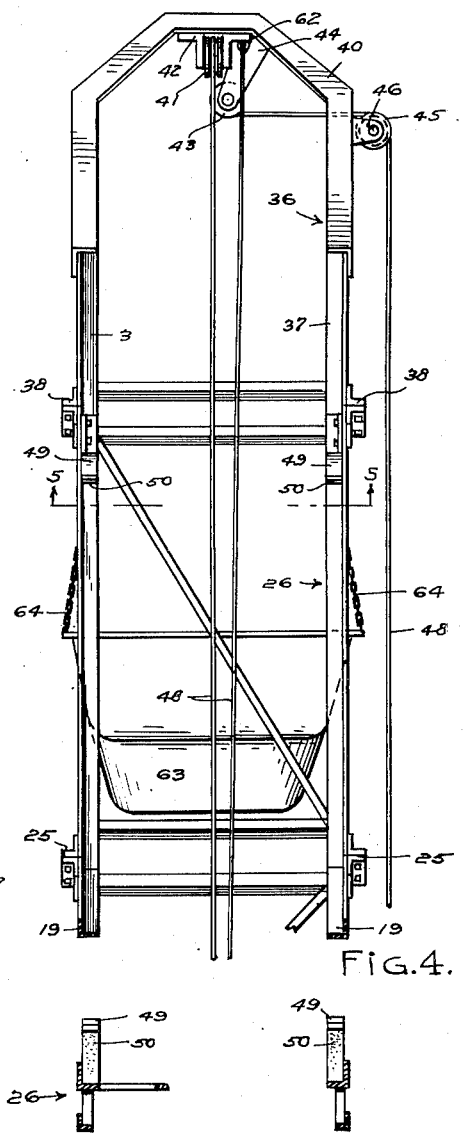
Fig. 4.
Fig. 5.
INVENTOR.
EARNEL W. WHITE,
BY
ATTORNEY.

Feb. 20, 1951  E. W. WHITE  2,542,383
PORTABLE ELEVATING CONVEYER
Filed Dec. 20, 1949  3 Sheets-Sheet 3

INVENTOR.
EARNEL W. WHITE,
BY
ATTORNEY.

Patented Feb. 20, 1951

2,542,383

UNITED STATES PATENT OFFICE 2,542,383

PORTABLE ELEVATING CONVEYER

Earnel W. White, Fort Lauderdale, Fla.

Application December 20, 1949, Serial No. 133,993

3 Claims. (Cl. 214—103)

This invention relates to improvements in material handling apparatus and primarily to apparatus for conveying and elevating such material as concrete, cement blocks, etc.

It is an object of the present invention to provide mechanism comprising an inclined trackway upon which is conveyed a wheeled carrier for the support of concrete or other materials having means for properly positioning the carrier for loading at the lower end of the trackway, conveying the carrier upward and bodily dumping the carrier contents into a suitable distribution trough at the upper end of the trackway by novel stop devices when the carrier has reached the limit of its upper travel.

A further object of the invention resides in novel means for properly positioning the carrier to loading position upon the ground or floor with means to accurately engage the carrier with the trackway prior to its upward travel.

Another object of the invention resides in the particular construction of the inclined trackway, whereby the trackway may be readily extended by adding sections thereto.

Another novel feature of the invention resides in the construction of the carrier and the means for causing it to dump its contents without its wheels leaving the trackway.

A further and very important object of the invention resides in the supporting base for the trackways and associated elements, having ground caster wheels in tricycle form whereby the inclined trackway and associated elements may be easily and quickly moved about with a minimum of effort, has novel mounting means for one caster wheel, with the base and the trackway and its associated elements being constructed rigidly in a manner to permit the entire mechanism to freely pass through a conventional three-foot door opening, thus greatly extending the use to which the device may be put.

Another relatively important object of the invention resides in extensible bars that carry at their outer ends screw jacks whereby the structure may be suitably braced against lateral tilting when in use and heavily loaded.

Other important structural advantages and novel control means for the carrier will be readily apparent during the course of the following description, reference being had to the accompanying drawings, wherein has been illustrated the preferred embodiment of the invention and wherein like characters of reference refer to like parts throughout.

Figure 7:
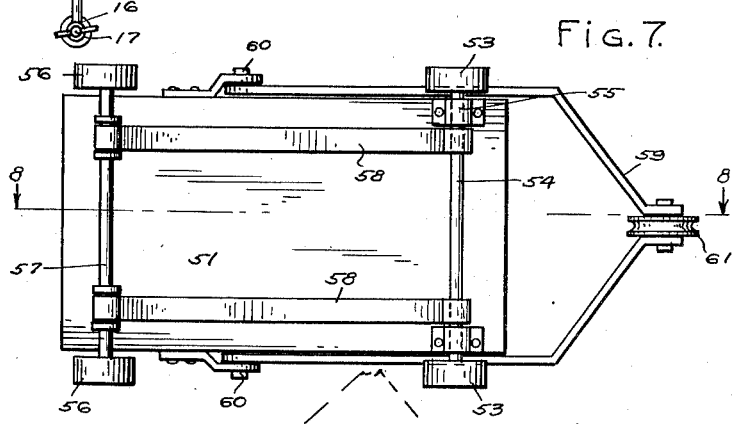
Figure 8:
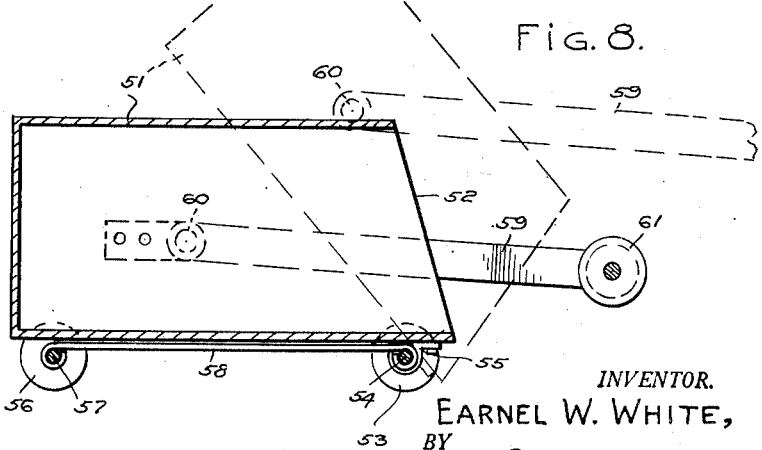

In the drawings:

Figure 1 is a fragmentary side elevation of a machine constructed in accordance with the invention, illustrating the lower portion thereof, Figure 2 is a side elevation of the upper portion of the machine, as extended from Figure 1, Figure 3 is a front elevation of the lower portion of the machine, Figure 4 is a front view of the upper portion of the machine as extended from Figure 3, Figure 5 is a fragmentary transverse section of the trackway, taken on line 5—5 of Figure 4, Figure 6 is a horizontal section taken on line 6—6 of Figure 1, with the base and associated elements in elevation, Figure 7 is a bottom plan view of a carrier and, Figure 8 is a longitudinal section taken on line 8—8 of Figure 7.

Referring specifically to the drawings, the numeral 5 designates a generally rectangular base frame elevated at one end, as at 6. The elevated end of the frame is supported at each corner by caster ground wheels 7. The opposite end of the frame is provided with an arcuate frame 8, preferably formed of T-iron. The frame 8 extends transversely and horizontally of the frame 5 and provides a swivel mounting 9 for a single caster ground wheel 10. The frame 5 is preferably formed of channel iron. Spanning the frame 5 transversely thereof are a pair of bars 11, serving as a support for a prime mover, such as an internal combustion engine 12. The engine 12 is provided with a double power pulley 13. The frame 5 has been primarily designed as to its dimensions so as to enable the device to be wheeled through a conventional door opening and the tricycle wheel mounting for the frame facilitates its shifting in relatively small quarters. The frame 5 at its forward end and beneath the forward channel is provided with a pair of tubular guide sleeves 14, slidably receiving, laterally extending, cylindrical rods 15, carrying at their outer ends tubular threaded sockets 16 for engagement by threaded jacks 17. In use, the bars 15 are extended to a desirable point and the jacks 17 screwed down, providing laterally braces against the lateral shifting of the frame 5.

Supported in an inclined manner upon the frame 5 is a conveyor track, designated as a whole by the numeral 18. Track 18 comprises a pair of spaced tracks 19, preferably formed of angle iron. The lower end of each track 19 is bent to cylindrical form, for pivotal support on a rod 20, extending across the front of the frame 5 and fixed in bearings 21 carried by the frame. Each track 19 is suitably braced against flexing by trussing 22, consist of angle irons 23 and truss bars 24 that are welded or otherwise attached jointly to the undersides of the tracks 19 and the angles 23. The upper terminal end of the tracks and angles 23 are connected transversely by angle irons 25, bolted or otherwise attached thereto. The angles 25 serve as connecting means for extension sections 26 of the device. The trackway may be braced against lateral twisting by diagonal braces 27. Pivotally supported upon the rod 20 and in longitudinal parallelism with the tracks 19, are shiftable legs 28 formed of angle iron and curved at their outer ends as at 29, serving as wheel sockets for a wheeled carrier, to be described. The legs 28 when engaged by the wheels of the carrier are shiftable downwardly to ground engaging position as shown in dotted lines in Figure 1 for maintaining the carrier wheels properly positioned for engagement with the tracks 19. The legs 28 are normally retracted by springs 30 connected with the curved ends 29 and with the sides of the tracks 19. In this manner the legs 28 are normally held out of engagement with the ground, thereby offering no resistance to the shifting of the device from place to place. The track structure 18 is supported in the desired position of angularity by intermediate braces 31, bolted at the upper ends of the sides of the track and at their lower ends to brackets 32 carried by the frame 5. Adjustable and telescopic braces 33 are supported from the rear corners of the frame 5 and pivotally connected at the connecting angles 25 as shown at 34. A suitable set-screw 35 maintains the telescopic braces in adjusted position. While but a single extension section 26 has been illustrated, it will be apparent that additional sections may be connected through the medium of the angles 25 when it is desired to extend the conveyor to varying heights. A head portion 36 comprising a pair of short track sections 37, corresponding to the tracks 19 are detachably connected to the upper end of the section 26 through the medium of angle iron 38. The track 37 is braced as at 39. Welded or otherwise connected with the free ends of the tracks 37 is a generally U-shaped frame 40, here shown as of angle iron construction. At its center portion, the frame 40 is provided with a grooved pulley 41 carried by suitable brackets 42. A second grooved pulley 43 carried by brackets 44 is disposed at a right angle to the pulley 41, while a pulley 45 is carried by brackets 46 outwardly of one leg of the frame 40. A hoisting cable 48 extending from a drum 47 and is trained over the pulleys 45, 43 and 41 for connection to the carrier, to be described. Rigidly positioned in the trackway of the section 26 and in the normal path of travel of the carrier wheels, to be described, are oppositely arranged dump stops 49, formed semicircular in shape, and preferably having a cushioned liner 50, for absorbing the shock of contact from the wheels of the carrier. Stops 49 are bolted or welded as is desirable.

The carrier consists of a general rectangular receptacle 51, open at one end 52. The upper track wheels 53 supported upon a shaft 54, journalled in bearings 55, fixedly support the position of the wheels 53 with respect to the discharge end of the receptacle. A second pair of track wheels 56 are carried upon a shaft 57, supported from the shaft 54 by a pair of bars 58. The bars 58 are pivotally supported with respect to the shaft 54, thus permitting the carrier to rock upon the axis of the wheels 53 without disturbing the track engaging relation of the wheels 56. The diameter of the wheels 56 and 53 correspond to the curvature of the stops 49 and the curved ends of the legs 28. The means for shifting the carrier 51 to traverse the trackways consists of a yoke 59 pivotally supported upon the opposite sides of the carrier 51 as at 60. The apex of the yoke is provided with a curved pulley 61 for the reception of the cable 48. The cable 48, after passing around the pulley 61 from the pulley 41, is connected at its terminal end to an eye 62 carried by the frame 40. A trough 63 is supported from the extension section 26 in any suitable manner, such as by chains 64 that permit the trough to be shifted from side to side. The mounting of the trough 63 is at a point below the stops 49 whereby the carrier 51 in its dumping action will discharge its contents thereinto. The tracks 19 adjacent their lower ends are provided with inclined deflector boards 65, serving as the means for accurately re-positioning the wheels 53 of the carrier upon the tracks after the receptacle has been loaded. As shown by dotted lines in Figure 1, the carrier 51 in loading position rests upon the ground with its open end upward and with the wheels 56 resting in the curved ends 29 of the legs 28 with the wheels 53 wholly disengaged from the track structure. The open end of the carrier 51 is preferably inclined for convenience in loading from a wheelbarrow.

Means are provided to control the movement of the carrier from a position of loading to a position of dumping discharge, consisting of the prime mover 12, driven through the medium of the small pulley 13 to a large pulley 66, through the medium of endless belts 67. The pulley 66 is mounted upon a transversely extending shaft 68 journaled in bearings 69 fixed upon the underside of the angles 23. The shaft 68 carries at one end a relatively small grooved pulley 70 engaged by endless belts 71 in turn engaging a relatively large pulley 72, freely rotatable upon a shaft 73. The shaft 73 extends transversely of the trackways and is supported in fixed bearings 74 carried upon the underside of the tracks 19. The opposite end of the shaft 73 supports the drum 47 thereon. The pulley 72, while being freely rotatable upon the shaft 73 is connected thereto through the medium of a friction clutch 75, manually controlled by a shifting handle 76. While the drive to the shaft 68 and pulley 70 is continuous, the drive to the shaft 73 and drum 47 is controlled at will by the operator. Therefore, through the medium of the clutch 75, the drum 47 may be controlled by the operator to shift the carrier in a vertical plane upon the trackways 19 for discharge and dumping engagement with the stops 49. Since the rotation of the pulley 72 is continuous in one direction, it follows that means must be provided to control the downward movement of the carrier after it has discharged its load. To control this action a brake drum 77 carried by one end of the winding drum 47 is controlled by a brake band 78 connected at one end as at 79, while its opposite end has pivotal connection with a crank 80 fixed upon a shaft 81, journalled in fixed bearings 82 carried upon the underside of the angles 23. At its opposite end the shaft 81 carries an operating handle 83 normally urged in one direction by a spring 84, connected with the handle and with the other side of one track 19. The tension of the spring 84 is sufficient to maintain braking connection to the band 78 with sufficient gripping force that will hold the carrier in any position upon the trackway against accidental shifting downwardly by gravity. Stops 59a limits swinging movement of the yoke 59 in one direction.

The operation of the device is as follows:

The machine having been moved to a desired point and assuming for purposes of illustration that it is desired to convey from a ground level to an elevated level such materials as concrete, concrete block, or the like, the engine 12 is started. While the clutch 75 is disengaged, there will be no rotation to the drum 47 and the carrier 51 is held against movement by the brake band 78. The operator then controls the handle 83 for permitting a reverse action to the drum 47, causing the carrier 51 to move downwardly along the trackways under the influence of gravity, pulling upon the cable 48. The movement or speed of the carrier is controlled to a fine degree by the manipulation of the handle 83 against the tension of the spring 84. The operator permits the carrier to move downwardly to a point where its track wheels 56 engage the legs 28, causing the legs to move downwardly to incline ground engaging position, at which time the carrier swings downwardly due to its own weight and rests firmly upon its closed end. A wheelbarrow carrying concrete to the carrier is then rolled forwardly and dumped into the open end of the carrier. The operator then moves the brake handle to brake disengaging position and simultaneously engages the clutch 75 through the medium of the shifting handle 76. The shaft 73 then imparts rotation to the drum 47 for winding the cable 48 thereon. The first movement of the drum 47 pulls upon the yoke 59 through the medium of the cable 48, swinging the carrier 51 toward the trackways until the wheels 53 engage the tracks 19. Should the ground or other surface be uneven and the carrier possibly setting at a slight angle, the deflectors 65 will accurately reposition the wheels 53 upon the tracks 19 when the carrier is swung inwardly. Continued movement of the drum causes the carrier to move in a vertical plane until its front wheels 53 contact the stops 49. Continued pulling movement upon the cable causes the carrier 59 to swing upwardly pivoting around the shaft 54 and, when in the proper angular position, will dump its contents into the trough 63 and, since the trough 63 is inclined downwardly, the concrete or other material will readily be discharged therefrom. When the carrier has swung to the full dumping position, the clutch is disengaged and the brake applied, thus relieving any unnecessary strain upon the cable 48. After the dumping action, the operator releases the brake 78 sufficiently to permit the carrier to move downwardly by gravity along the trackways for re-loading.

It will be apparent from the foregoing that an extremely novel and highly efficient machine has been designed for the rapid elevation of materials, such as concrete. The structure is of such nature that it will readily adapt itself to construction work wherein it is difficult to position any suitable elevating conveyor. The structure has been designed primarily for shifting movement in small areas and may readily pass through conventional door openings, thus permitting the device to be moved about the building for conveying concrete to an elevated position that would be difficult and impossible with other mechanical elevators. The base frame for supporting the structure in tricycle form permits it to swing in a relatively small arc. The bracings are such as to present a rigid non-flexible trackway that may be disposed at varying angles as may be necessary. Further, the structure is such that the track structure may be removed from the base for rapid transport of the apparatus to different points. Another advantageous feature of the structure resides in the provision of means for extending the height of the trackways, by the simple expedient of bolting their ends together. The parts are few and simple, are strong, durable, requires relatively little attention, is cheap to manufacture, and is highly efficient in use.

It is to be understood that while a preferred example of the invention has been illustrated and described, it will be apparent that various changes in the shape, size and arrangement of parts may be resorted to as fall within the scope of the subjoined claims and as determined by the prior art.

Having described my invention, what I claim as new and desire to secure by Letters Patent is:

1. An elevating conveyor comprising a rectangular channel iron base having a forward swivel ground wheel centrally disposed and a pair of swivel ground wheels at its rear corners, the rear portion of the frame being elevated with respect to the forward portion, a prime mover supported on the frame, trackways pivotally supported at their lower ends to the forward end of the base and vertically inclined over the base, supporting braces from the base to the trackways, the trackways comprising a pair of spaced angle iron tracks, trussing for the rigid support of the tracks, upper track extension detachably connected with the trackways, a U-shaped head detachably connected with the track extension, the extension and the head being axially aligned with the trackways, a lower track extension leg pivotally supported upon the front end of the base and in alignment with the tracks, the legs being shiftable downwardly to ground engaging position against the tension of a retractile spring, deflector plates carried by the tracks adjacent their lower ends, extensible jack supports carried by the base upon opposite sides, a material carrier of rectangular form open at its forward end, a pair of front track wheels rotatably supported at the forward end of the carrier, a pair of rear track wheels for the carrier pivotally supported from the support for the front wheels, a hoisting yoke for the carrier, a hoisting drum having a cable wound thereon, the drum carried by a cross shaft supported by the trackways, brake means for the drum, operating means for the brake, a power shaft driven from the prime mover that is supported by the trackways, a takeoff pulley for the shaft, a clutched pulley for driving the drum shaft in one direction to wind the cable thereon, pulleys carried by the head, said cable trained from the drum to the head pulleys and the carrier yoke and dumping stops carried by the track extension for swinging the carrier to dumping position about the supports of the front carrier wheels.

2. An elevating inclined conveyor comprising a rectangular base formed of channel iron and having its rear portion elevated, caster ground wheels at each rear corner of the base, a pair of intersecting arcuate supports carried by the forward portion of the base, a caster wheel carried centrally of the supports, a prime mover supported on the base, laterally extending ground jacks carried by the underside of the base adjacent its forward end, a rod fixedly supported upon the forward end of the base, a pair of inclined tracks having their lower ends pivotally supported on the rod, trusses for the rigid support of the tracks, brace means from the base to the tracks for maintaining the angularity thereof, the brace means being adjustable, upper trussed track extensions detachably bolted to the upper ends of the tracks, a U-shaped head detachably bolted to the upper end of the extension, the tracks and its extension being axially aligned, curved dump stops carried by the track extension adjacent its upper end, a distribution trough swingably supported by the track extension below the stops, a plurality of cable pulleys carried by the head, lower shiftable track extension legs pivotally supported on the rod and adapted to swing to ground engaging position against the tension of retractile springs, the forward ends of the legs being curved to form wheel sockets, a box-like carrier open at one end and having a pair of track wheels fixedly positioned adjacent the open end and a pair of track wheels supported from the mounting of the first named track wheels, the carrier adapted to rest upon the several wheels during a traverse of the tracks, the carrier in its lowermost position adapted to have the second named track wheels engage the legs for permitting the carrier to swing to a position of loading with its closed end resting upon the ground, deflectors carried by the tracks adjacent their lower ends, the carrier when in its uppermost position engaging the stops to swing about the support of the first named track wheels to dumping position, power means from the prime mover for controlling a cable to move the carrier upward of the tracks to dumping position and brake means for controlling the downward movement of the carrier to loading position.

3. A vertically inclined material elevator that includes a base frame that is ground supported by tricycle caster wheels, the elevator comprising a pair of spaced tracks, rigid trussing for the tracks against flexing, the lower ends of the tracks being detachably connected to the forward end of the frame, adjustable brace members for maintaining the angularity of the tracks, laterally extending ground engaging jacks carried by the frame, pivotally supported lower track extension legs having their ends curved to form wheel sockets, springs for moving the legs to horizontal position, the legs adapted to swing to ground engaging position under the influence of carrier wheels, an upper track extension detachably bolted to the upper end of the tracks, a cable control head detachably bolted to the upper end of the extension, cable pulleys carried by the head, deflector plates fixed to the sides of the tracks adjacent their lower ends, a cable winding drum carrying a cable to be trained through the pulleys of the head, brake means for the drum, power drive means for the drum, spring means for moving the brake to engaging position, manual means for the release of the brake, clutched control from the power means to the drum, a box carrier open at one end and provided with fixed position front track wheels, a pair of bars pivotally supported on the support for the front wheels and carrying a pair of rear track wheels, with the carrier resting on the bars and front wheel mountings, the carrier adapted to traverse the tracks under the influence of a cable from the drum, curved stops fixed upon the track extension adjacent its upper end and in the path of travel of the carrier wheels, the carrier at the limit of its upper movement having its forward wheels engage the stops to swing the carrier bodily about the mounting of the front wheels to dumping position, the several carrier wheels maintaining their track engagement during the traverse and dumping, the carrier at its lowermost position having its rear wheels engaging the track extension legs to swing the legs to ground engaging position and swing the carrier to a position with its closed end resting upon the ground for loading and a distribution chute for the material dumped from the carrier that is suspended from the tracks by flexible hangers below the point of dumping.

EARNEL W. WHITE.

REFERENCES CITED

The following references are of record in the file of this patent:

UNITED STATES PATENTS

| Number    | Name       | Date          |
|-----------|------------|---------------|
| 1,250,478 | McKenzie   | Dec. 18, 1917 |
| 1,324,900 | Insley et al. | Dec. 16, 1919 |
| 1,449,733 | Clausen    | Mar. 27, 1923 |
| 2,400,939 | Martin     | May 28, 1946  |
| 2,431,047 | Jones      | Nov. 18, 1947 |

FOREIGN PATENTS

| Number  | Country       | Date         |
|---------|---------------|--------------|
| 176,200 | Great Britain | Mar. 9, 1922 |